United States Patent

Boutaghou et al.

[11] Patent Number: 5,808,184
[45] Date of Patent: Sep. 15, 1998

[54] THERMAL ASPERITY SENSOR HEAD WITH MULTIPLE SPACED ASPERITY SENSORS

[75] Inventors: Zine-Eddine Boutaghou, Vadnais Heights; Lowell James Berg, Minnetonka; Mark James Schaenzer, Eagan; Peter Raymond Segar, Burnsville, all of Minn.

[73] Assignee: Seagate Technology, Inc., Scotts Valley, Calif.

[21] Appl. No.: 855,325

[22] Filed: May 13, 1997

Related U.S. Application Data

[60] Provisional application No. 60/035,008 Jan. 15, 1997.
[51] Int. Cl.$^6$ ........................................................ G01B 5/28
[52] U.S. Cl. ............................................................ 73/105
[58] Field of Search ........................ 73/104, 105, 12.01, 73/12.09

[56] References Cited

U.S. PATENT DOCUMENTS

| | | | |
|---|---|---|---|
| 4,048,849 | 9/1977 | Gocho et al. | 73/105 |
| 4,674,875 | 6/1987 | Koizumi | 356/237 |
| 4,881,136 | 11/1989 | Shiraishi et al. | 360/25 |
| 4,931,338 | 6/1990 | Toffle | 428/65 |
| 5,063,712 | 11/1991 | Hamilton et al. | 51/67 |
| 5,410,439 | 4/1995 | Egbert et al. | 360/75 |
| 5,412,519 | 5/1995 | Buettner et al. | 360/73.03 |
| 5,423,111 | 6/1995 | Mori | 29/90.01 |
| 5,488,857 | 2/1996 | Homma et al. | 73/105 |
| 5,527,110 | 6/1996 | Abraham et al. | 374/5 |
| 5,528,922 | 6/1996 | Baumgart et al. | 73/1 |
| 5,581,021 | 12/1996 | Flechsig et al. | 73/105 |
| 5,640,089 | 6/1997 | Hirikawa et al. | 73/105 |

Primary Examiner—Robert Raevis
Attorney, Agent, or Firm—Westman, Champlin & Kelly, P.A.

[57] ABSTRACT

An asperity sensing head is used for detecting asperities on the surface of a disc while the disc is rotated. The asperity sensing head includes a slider body having a first rail and an air bearing surface. A first asperity sensor is carried by the slider body in the first rail. A second asperity sensor is also carried by the slider body in the first rail wherein the first and second asperity sensors are separated by a groove in the first rail.

24 Claims, 6 Drawing Sheets

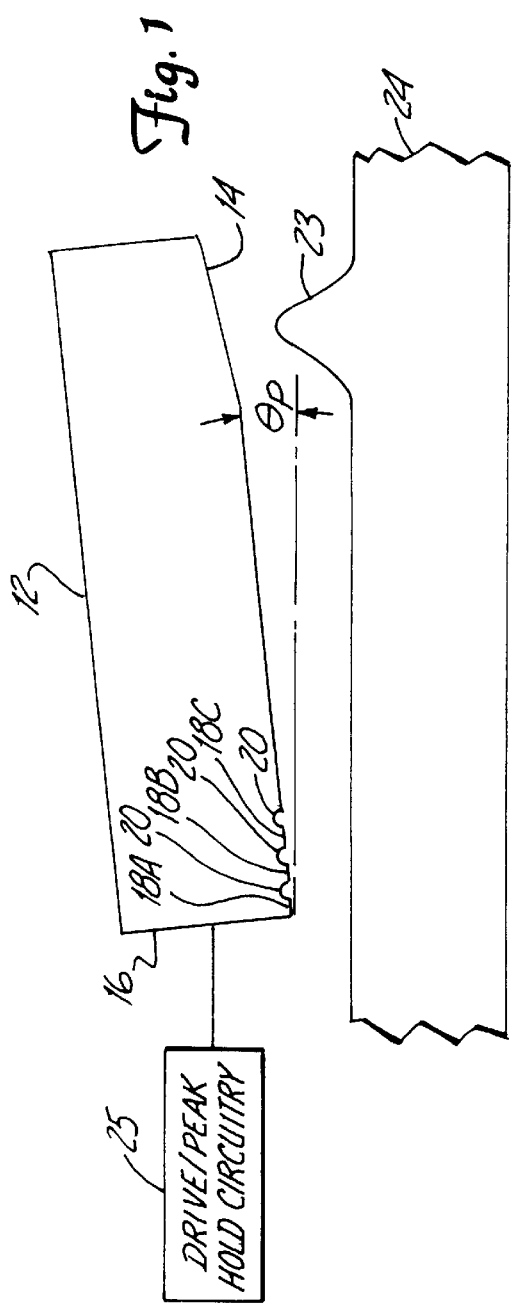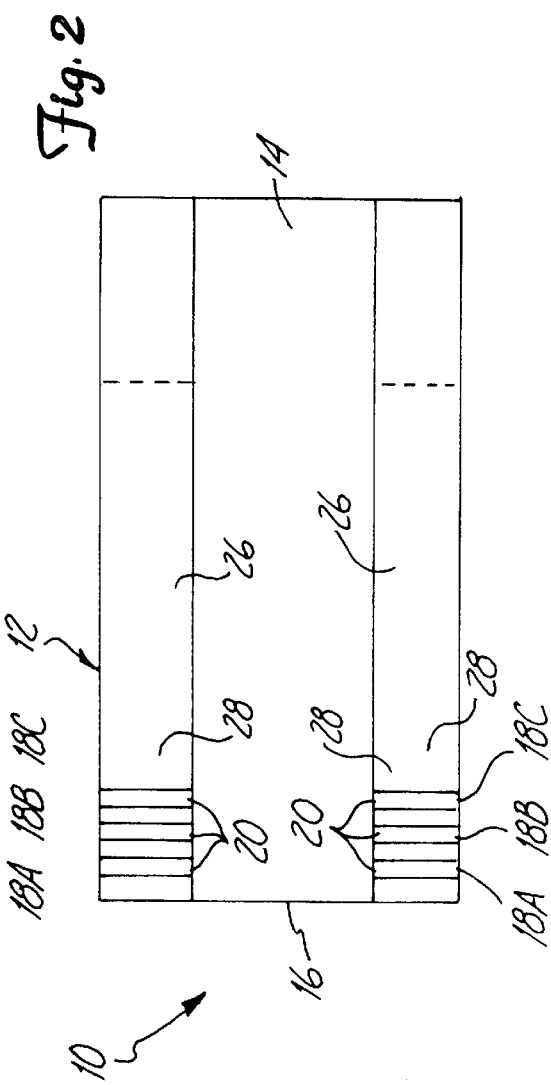

THERMAL ASPERITY SENSOR HEAD WITH MULTIPLE SPACED ASPERITY SENSORS

BACKGROUND OF THE INVENTION

The present application claims the benefit of earlier filed U.S. provisional application Ser. No. 60/035,008 entitled MULTI-IMPACT GLIDE SENSOR/BURNISH HEAD, filed on Jan. 15, 1997.

The present invention relates generally to disc drive data storage devices. More particularly, the present invention relates to a thermal asperity sensing head which provides detailed information as to thermal asperity defect sizes and heights.

In disc drive data storage devices, digital data are written to and read from a thin layer of magnetizable material on a surface of one or more rotating discs. Write and read operations are performed through a transducer which is carried in a slider body. The slider and transducer are sometimes collectively referred to as a head, and typically a single head is associated with each disc surface. When the transducer is a magnetoresistive (MR) type sensor, the combination of the slider and the transducer are frequently referred to as an MR head. The heads are selectively moved under the control of electronic circuitry to any one of a plurality of circular, concentric data tracks on the disc surface by an actuator device. Each slider body includes an air bearing surface (ABS). As the disc rotates, the disc drags air beneath the ABS, which develops a lifting force that causes the head to lift and fly several microinches above the disc surface.

In operation, the head can come into contact with asperities on the surface of the disc while the head flies above the surface of the disc. Potentially, this undesirable contact can cause data written to a particular location on the disc to be lost. Immediately after contact with an asperity, the heat generated by the contact changes the resistive properties of the MR sensor. As a result, the corresponding signal read by the MR head is distorted by a voltage spike and subsequent decay, sometimes causing the data stored near the asperity to be unrecoverable. The voltage spike in the read signal is frequently referred to as a "thermal asperity," while the defect on the disc is referred to as an "asperity". However, since one is indicative of the other, the two terms are frequently used interchangeably.

Disc asperities which are located in the factory during a defect scanning process can be recorded in a disc drive's primary defect list, so that the drive does not store data at those locations. Thermal asperity detection for the purpose of mapping the disc defects relies both upon the fly characterization of the heads and upon the thermal response from friction induced head/asperity contact. By calibrating the slope and duration of the resistance change waveform to a range of asperity heights and characteristics, the height of a particular asperity can be determined by detecting the momentary change in resistance of the sensor after contact.

Current thermal asperity detection methods are limited to using either existing MR data heads having a narrow MR sensor track width, or to specially designed heads having an increased MR sensor track width. Each of these types of heads have inherent limitations. Using existing MR data heads, with track widths typically less than 2.5 $\mu$M, the time for a full surface scan is quite lengthy, approaching 30 minutes. Further, existing MR data heads of the type used in disc drive systems are designed to reduce sensitivity to thermal asperity response by having increased fly heights and MR sensor recession within the slider body.

Specially designed thermal asperity heads can reduce the surface scan time and increase the thermal asperity response by using a wider MR sensor track, for example, 60 $\mu$M. Using these specially designed heads, the process of mapping the disc defects while changing the fly height of the head requires several scans at different head fly heights to map the entire range of defects. As the speed is changed, the response of the specially designed head also changes. For example, if the speed is reduced, the energy of the impact is reduced, thus making it more difficult to calibrate to the defect size and height.

Asperity detection can also be accomplished using piezoelectric material, instead of an MR sensor. On impact between an asperity and the head, both head vibration modes and PZT excitation are detected. The energy of the impact is then calibrated to the height of the asperity.

However, this method presents a number of disadvantages. A variety of things can contribute to a measured signal provided by the piezoelectric detector. For example, PZT excitation is sensitive to noise. Air bearing excitation, PZT excitation, slider frequency modes and other system vibrations all contribute to the measured signals. Further, a measure of RMS excitation does not guarantee a physical impact, especially for detection of small defects. However, detection of small defects are important. The are potential sites for growing thermal asperities because they may be smear nucleation sites.

SUMMARY OF THE INVENTION

An asperity sensing head is used for detecting asperities on the surface of a disc while the disc is rotated. The asperity sensing head includes a slider body having a first rail and an air bearing surface. A first asperity sensor is carried by the slider body in the first rail. A second asperity sensor is also carried by the slider body in the first rail wherein the first and second asperity sensors are separated by a groove in the first rail.

BRIEF DESCRIPTION OF THE DRAWINGS

FIG. 1 is a diagrammatic side view illustrating the asperity sensor head of the present invention.

FIG. 2 is a diagrammatic ABS view of the asperity sensor head illustrated in FIG. 1.

DETAILED DESCRIPTION OF THE PREFERRED EMBODIMENTS

Figure 3:
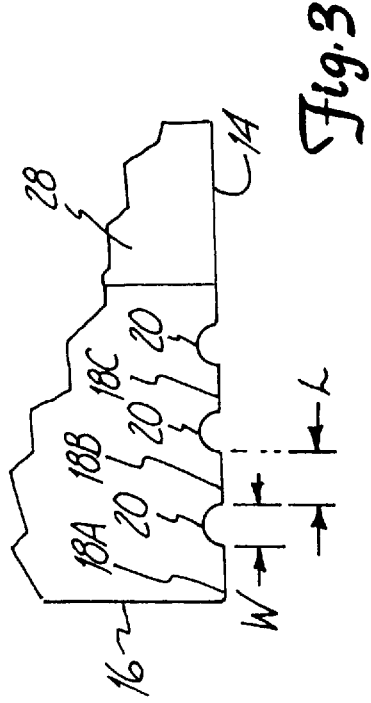
FIG. 3 is a diagrammatic side view of a portion of the asperity sensor head of the present invention, which further illustrates the spacing between the multiple sensors on the head.

In order to overcome limitations in the prior art of detecting and mapping all of the asperities on a disc surface, including determining the size of individual asperities, the present invention includes an asperity sensor head which generates multiple time-spaced impacts between a single asperity and the head. This is accomplished by fabricating multiple asperity sensors (such as MR sensors or PZT sensors) on the rails of the head slider body.

FIG. 1 illustrates thermal asperity sensor head 10 in accordance with preferred embodiments of the present invention. Head 10 includes slider body 12 having ABS 14 and trailing edge 16. Head 10 also includes multiple asperity sensors (such as MR or PZT sensors, only sensors 18A, 18B and 18C are illustrated in FIG. 1) adjacent ABS 14 near trailing edge 16. While only three MR sensors are illustrated in FIG. 1, preferred embodiments of the present invention include five or more MR sensors. The various MR sensors are referred to generically as sensors 18.

MR sensors 18 are fabricated at the wafer level using well known MR element (MRE) fabrication techniques from known MR materials such as NiFe.

Between each adjacent pair of MR sensors (i.e., between sensors 18A and 18B), a groove 20 is included. Groove 20 serves both to electrically insulate adjacent MR sensors from each other, and to generate multiple time spaced impacts from a single asperity contact between the MR sensors and an asperity 23 on surface 22 of a disc 24. As head 10 flies above surface 22 of disc 24, ABS 14 forms pitch angle $\theta_p$ relative to the plane of surface 22 of the disc. In other words, head 10 flies at pitch angle $\theta_p$. As is discussed below in greater detail, the distance between sensors is closely controlled in order to achieve a desired asperity height detection sensitivity or resolution for pitch angle $\theta_p$.

Drive/peak hold circuitry 25 is coupled to MR sensors 18 through bond pads or terminals on a surface of slider body 12, typically trailing edge 16. Circuitry 25 is of the type known in the art which supplies sensing current or voltage to the MR sensors, and which can detect changes in resistance of the sensors (typically via changes in voltage or current). Circuitry 25 could, of course, also be configured to detect PZT excitation or other similar signals induced by a head/asperity impact. Ideally, circuitry 25 couples the output signals of the various sensors in such a manner that a single composite signal having a number of individually detectable resistance changes (hits) represented.

FIG. 2 is a diagrammatic ABS view of head 10 which further illustrates features of the present invention. As illustrated in FIG. 2, in some preferred embodiments slider body 12 of head 10 includes one or more rails 26 which form a portion of ABS 14. The particular embodiment illustrated is a two-rail head slider design. However, other designs such as center-rail head slider designs may only include a single rail. During the fabrication process, portions of rails 26 act as substrates 28 upon which MR sensor layers 18 are deposited and grooves 20 are formed.

As illustrated, on each rail 26 of head 10, three MR sensors 18A, 18B and 18C are deposited. Thus, while three grooves 20 are shown, at least two grooves 20 would be required for each rail, one between sensors 18C and 18B, and one between sensors 18B and 18A. While thermal asperity sensor head 10 of the present invention is illustrated in FIGS. 1 and 2 as having three MR sensor layers on each rail, in preferred embodiments, each rail can contain five or more MR sensor layers. Further, while MR sensors 18 are illustrated on each of the rails of head 10, in other possible embodiments the MR sensors are located only on one of the rails of head 10. Also, for performance flexibility, differing sensor patterns and/or spacing can be used on each of the rails of the slider body.

FIG. 3 is a diagrammatic side view of a portion of head 10 which illustrates the pitch (length L) between adjacent MR sensors 18. Since MR sensor layers are very thin as is known in the art, pitch L is preferably smaller than the width W of grooves 20 between each pair of adjacent MR sensors. Pitch L can be controlled, by controlling the thickness of the grooves, in order to achieve a desired resolution or sensitivity. L is preferably in a range of approximately 0.5–3.0 µm, and W is preferably in a range of approximately 20–30 µm.

During operation in which head 10 comes into contact with an asperity on the surface of the disc, the contact duration between each MR sensor and the asperity is determined by the linear velocity of the disc and the length L of the sensor. Pitch angle $\theta_p$, typically on the order of 150–200 microradians, is assumed to be small in the following calculations. The width W of grooves 20 between MR sensors is configured to control the time separating separate impacts. The size of L and W serves to control the resolution of the asperity height determination. Assuming that the grooves 20 are spaced apart uniformly as illustrated in FIG. 3, the relationship between the height of the asperity and the number of hits detected is shown in Equation 1.

$$H_A = H_{MFH} + (N*(L+W)*\theta_p) \quad \text{Equation 1}$$

Where, $H_A$ = the detected asperity height;

$H_{MFH}$ = the minimum fly height of the head;

N = the number of impacts detected;

L = the sensor lamination pitch or length of sensor 20; and $\theta_p$ = the pitch angle of the head while flying.

The time between impacts is estimated as $$t = W/v \quad \text{Equation 2}$$

where t = the time between impacts of an asperity on consecutive sensors 18; and v = linear disc velocity under the head.

A given sensitivity to asperity height is obtained as follows:

$$AHS = (L+W)*\theta_p \quad \text{Equation 3}$$

where

AHS = asperity height sensitivity.

For a slider with a pitch angle $\theta_p$ of 150 microradians, corresponding values of the sensor lamination thickness L and groove width W and the asperity height sensitivity or resolution are shown in Table 1.

TABLE 1

| L + W (µm): | 1 | 10 | 100 | 1000 |
|---|---|---|---|---|
| asperity height sensitivity (nm): | 0.15 | 1.5 | 15 | 150 |

In order to obtain a reasonable resolution or sensitivity, a preferred value of L+W for this pitch angle $\theta_p$ is between 20 and 30 microns (µm). However, it is clear that for other pitch angles $\theta_p$ or asperity height detecting sensitivities or resolutions desired, other sensor lamination pitches and groove widths would be preferred. Generally, sensor lamination pitches L of at least 0.5 µm are preferred. This can be contrasted to traditional dual MR sensors having a typical spacing between sensors of approximately 500 Å (0.05 µm or microns), and to spin valve or giant MR effect heads having spacing between the various MR sensor layers of considerably less than 500 Å.

Figure 4:
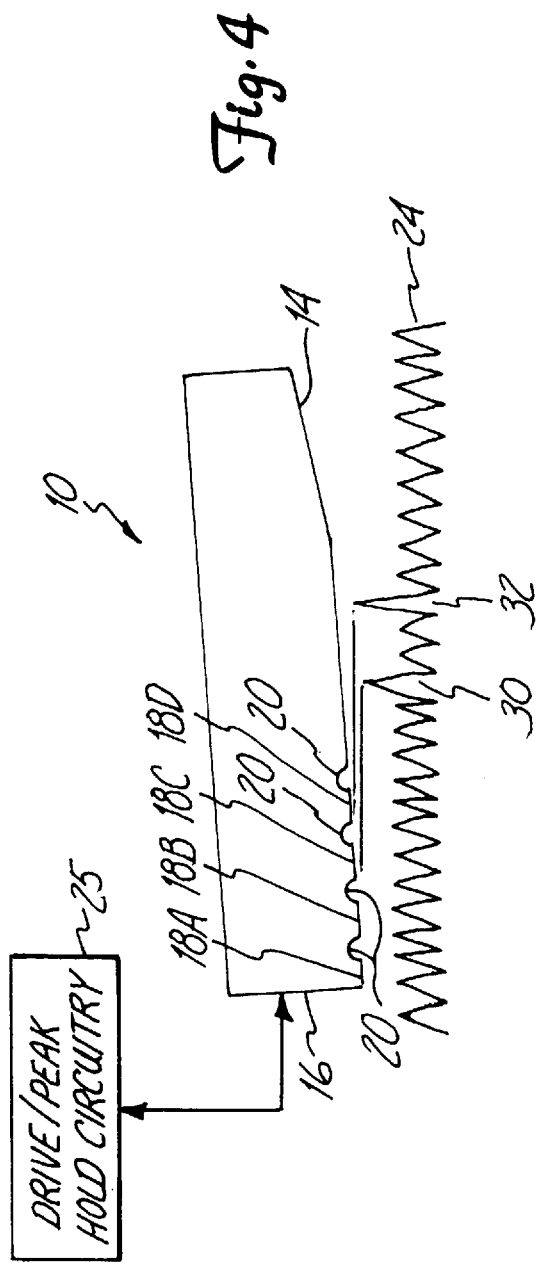
FIG. 4 is a diagrammatic side view of the asperity sensor head of the present invention which illustrates the manner in which the head detects and determines the heights of various asperities on the surface of a disc.

FIG. 4 is a diagrammatic side view which illustrates the manner in which head 10 is used both to detect the location of asperities on the surface of disc 24, and to determine the heights of the various asperities detected. As head 10 flies above the surface of disc 24 at pitch angle $\theta_p$, circuitry 25 drives the MR sensors and monitors a read signal from the sensors for changes in resistance which are indicative of contact between head 10 and an asperity located on the surface of the disc.

Figure 5:
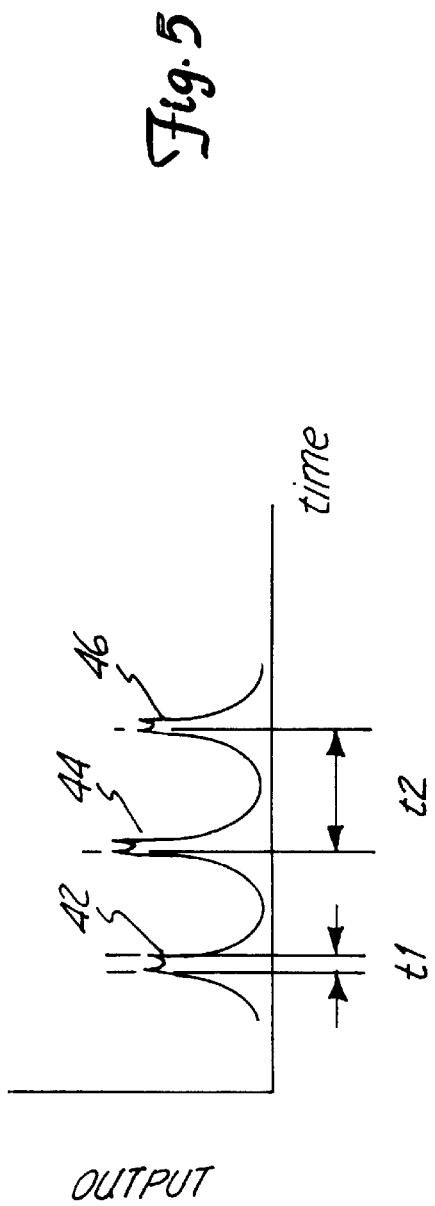
FIG. 5 is a plot illustrating an output signal from the asperity sensor head of the present invention after contact with a first asperity on a surface of the disc which has a first height causing detection by three of the sensors on the head.

FIG. 4 illustrates two separate asperities, asperities 30 and 32, having different heights. For convenience, both asperities are shown in FIG. 4 in close proximity to one another. However, for the sake of discussion it is assumed that the asperities are spaced apart sufficiently such that contact between asperity 30 and the slider body of head 10 is independent of contact between asperity 32 and the slider body. In other words, asperities 30 and 32 are assumed to be spaced apart far enough for the fly height and pitch angle to have stabilized, after contact with asperity 30, before contact with asperity 32. Also, in FIG. 4, head 10 includes five MR sensors 18A, 18B, 18C, 18D and 18E. A composite read signal provided by circuitry 25 after contact between head 10 and asperity 30 is illustrated in the plot of FIG. 5. A composite read signal provided by circuitry 25 after contact between head 10 and asperity 32 is illustrated in FIG. 6.

As can be seen in FIGS. 4 and 5, the height of asperity 30 is such that asperity 30 will contact the ABS 14 of head 10 adjacent MR sensors 18C, 18B and 18A, respectively. However, asperity 30 will not make contact with ABS 14 adjacent sensors 18D and 18E. In the plot of FIG. 5, voltage (or current) spike 42 is caused by the temporary change in resistance of sensor 18C after contact with asperity 30. Spikes 44 and 46 are caused by contact between asperity 30 and sensors 18B and 18A, respectively. A peak detector and counter in circuitry 25 keeps track of the number of "hits" within a predetermined time period, and thereby determines the height of asperity 30. Also, time $t_1$ corresponds to the duration of contact with a sensor while time $t_2$ corresponds to spacing between consecutive impacts.

Figure 6:
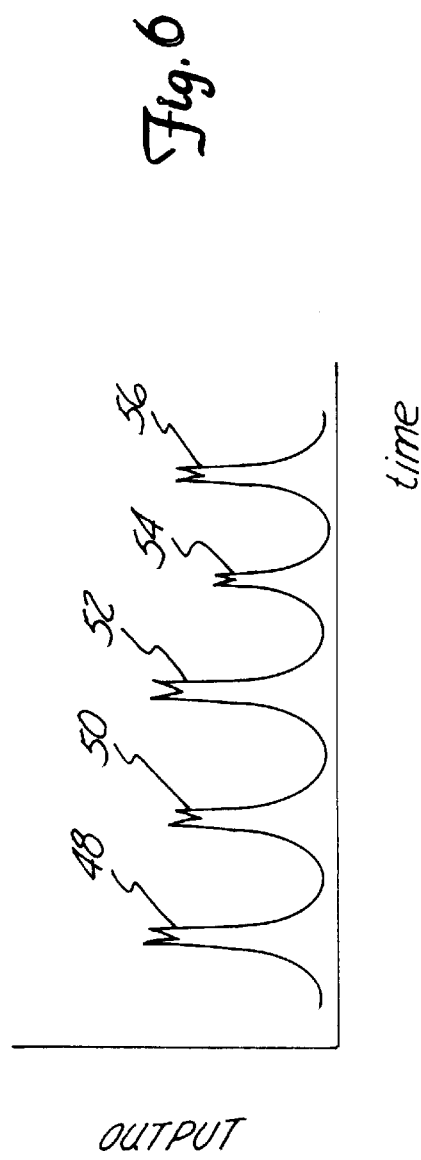
FIG. 6 is a plot illustrating an output signal from the asperity sensor head of the present invention after contact with a second asperity on a surface of the disc which has a second height causing detection by five of the sensors on the head.

As can be seen in FIGS. 4 and 6, because asperity 32 is taller than asperity 30, it will contact MR sensors 18E, 18D, 18C, 18B and 18A, respectively. Thus, five distinct peaks (impacts or hits) will be detected by circuitry 25. In FIG. 6, spikes 48, 50, 52, 54 and 56 correspond to contact between asperity 32 and sensors 18E, 18D, 18C, 18B and 18A, respectively. Using the relationship shown in Equation 1, height $H_A$ of each asperity can be determined from the number of hits N, the known sensor lamination pitch L, groove width W, the minimum fly height $H_{MFH}$ of ABS 14, and the pitch $\theta_p$ of the slider.

Figure 7A:
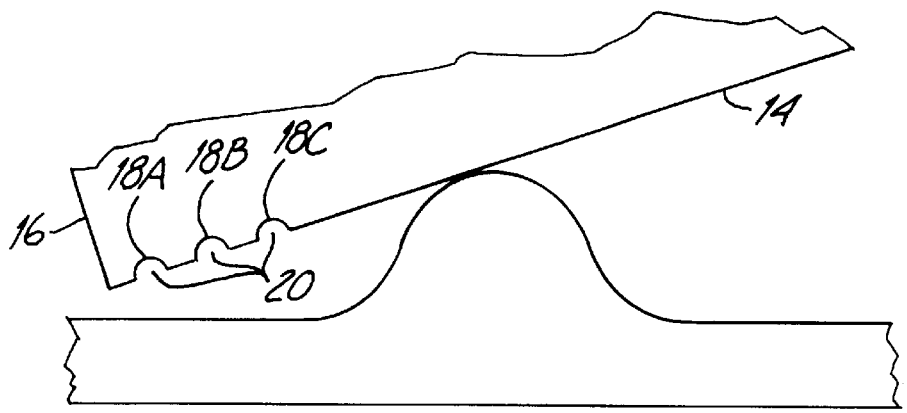
FIGS. 7A–7D are diagrammatic illustrations which demonstrate the manner in which previously undetected asperities can be detected using the asperity sensor head of the present invention.
Figure 7B:
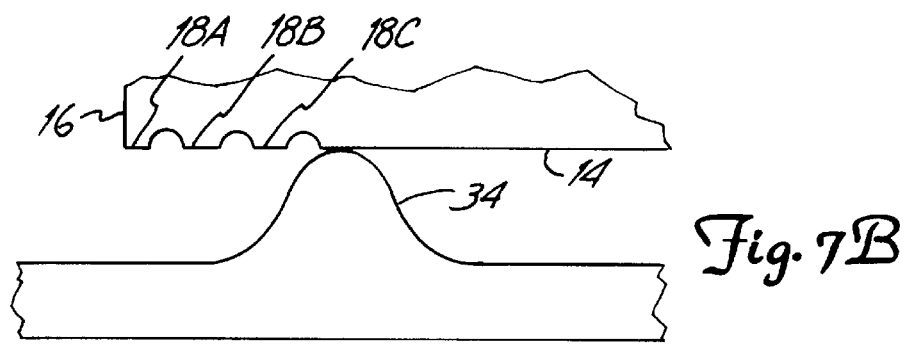
Figure 7C:
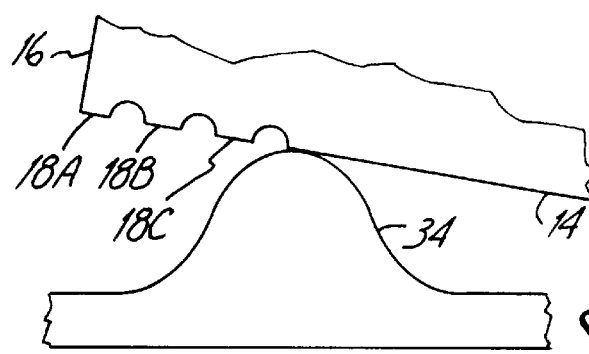
Figure 7D:
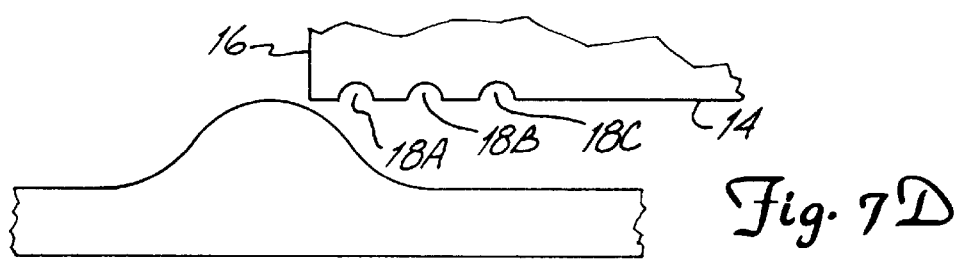

In addition to providing the ability to accurately determine the heights of asperities on the surface of the discs, the multiple MR sensors of head 10 of the present invention increases the probability that thermal asperities will be detected from contact with broad shallow defects. In conventional thermal asperity detecting heads having only a single sensor, contact between an asperity and the ABS can temporarily alter the flight of the head such that the MR sensor/asperity contact does not produce a thermal asperity in the read out signal. As illustrated progressively in FIGS. 7A and 7B, the initial contact between ABS 14 and asperity 34 can alter the fly height and pitch angle $\theta_p$ of the head temporarily. As shown progressively in FIGS. 7C and 7D, because of the altered flight of the head, MR sensor 18C makes contact with asperity 34, but MR sensors 18A and 18B do not. Thus, by including multiple MR sensors spaced apart on ABS 14 of the slider body, the likelihood that at least one of the MR sensors will contact broad shallow defects, such as asperity 34, increases. Without the benefit of the multiple spaced apart MR sensors of the present invention, the presence of asperity 34 might go undetected.

Figure 8:
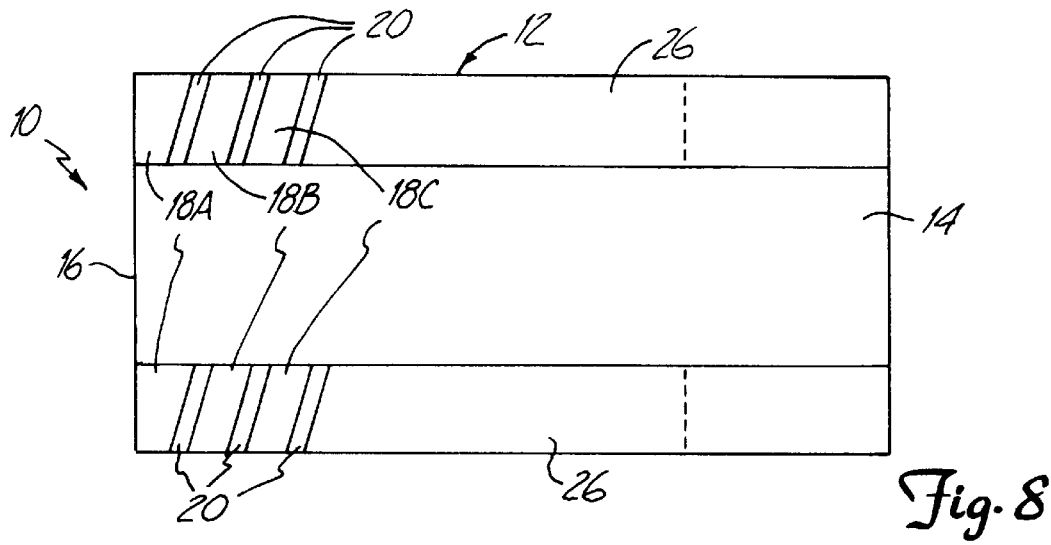
FIGS. 8–13 illustrate various different configurations of asperity sensors on a slider in accordance with different embodiments of the present invention.

The present invention can also be implemented in different configurations to accommodate for different disc drive configurations. For example, in an embodiment in which defects are mapped using a rotary actuator to move the head, a skew angle is introduced between the head and the track on disc surface. Thus, grooves 20 can be implemented on head 10 at an angle to accommodate for the skew. FIG. 8 illustrates grooves 20 implemented on the rails of head 10 in such a manner as to offset, or accommodate for, the skew angle.

Figure 9:
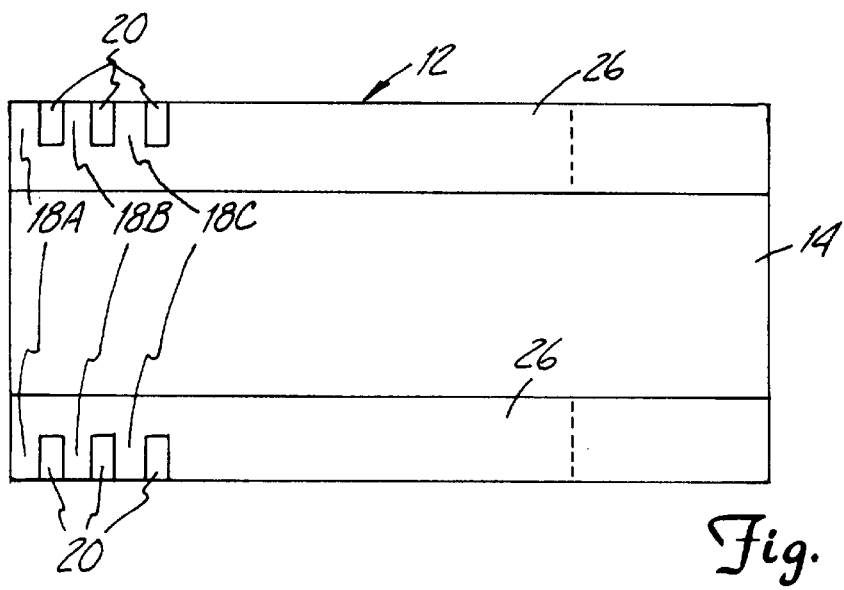
Figure 10:
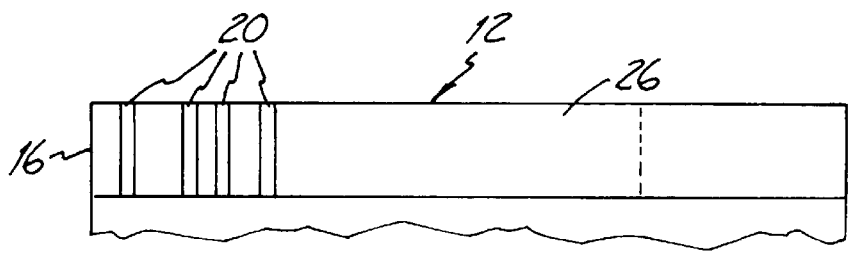
Figure 11:
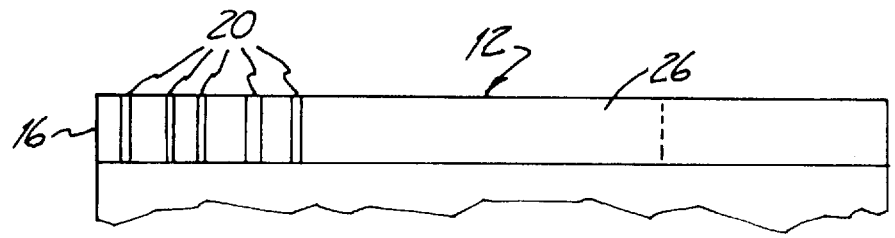
Figure 12:
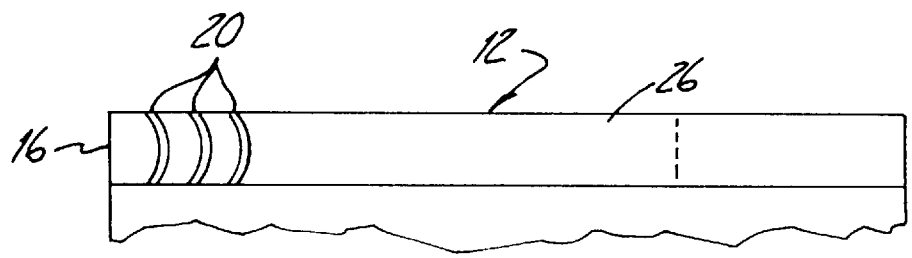

Further, in some embodiments, other configurations or grooves 20 may provide more useful time or frequency signatures than those previously illustrated. For example, FIG. 9 illustrates an embodiment in which grooves 20 do not extend all the way across the rails. FIG. 10 illustrates an embodiment in which the spacing between grooves 20 is non-uniform. It should also be noted that other non-uniformity, such as graduated spacing, can also be used. Further, FIG. 10 only illustrates one rail. In some embodiments, grooves 20 and sensors 18 may be placed only on a single rail. FIG. 11 illustrates an embodiment in which the width W of grooves 20 is non-uniform. Finally, FIG. 12 illustrates an embodiment in which grooves 20 are curved. Other groove configurations can also be used in other preferred embodiments.

Figure 13:
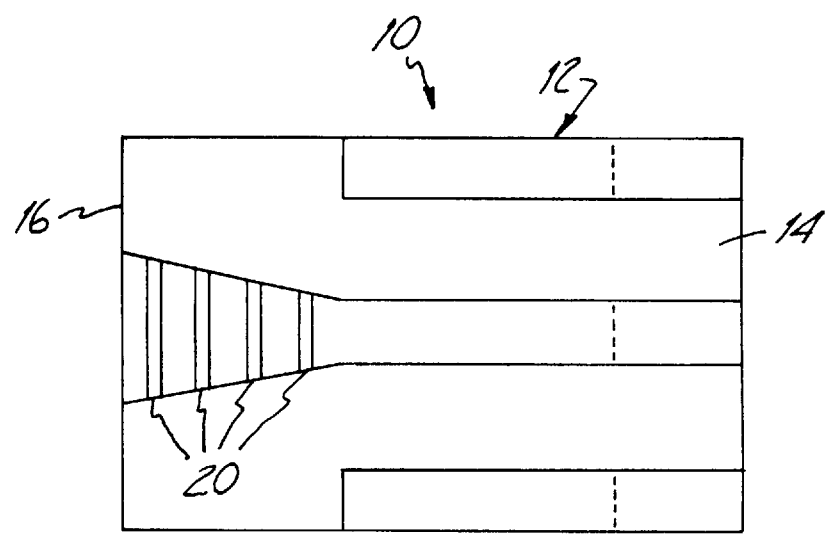

In addition, it should be noted that the present invention can be implemented on different types of sliders, such as a center rail slider shown in FIG. 13. In that instance, grooves 20 and sensors 18 may be placed on the center rail. It should also be noted that different groove and sensor configurations can be placed on different rails on a single slider.

Also, in the preferred embodiment it is desirable fly very close to the glide avalanche of the media without contacting the media. This generally corresponds to the minimum fly height. Mapping of all asperities above the minimum fly height of the slider can be accomplished in only one single scan of the disc surface at only one linear disc speed. In fact, a full assessment (impact count, location and height) of asperities can be obtained in a single scan at a single disc speed.

Further, impact between the heads 10 and asperities are expected to create high contact stresses at the abrupt changes in the groove edges. Thus, the geometrical configuration of the grooves may be changed or optimized to burnish the asperity. The edges of the grooves can be made sharper, or rounder, and the angle approaching the terminus of the groove can also be changed to create any desired burnishing effect.

Although the present invention has been described with reference to preferred embodiments, workers skilled in the art will recognize that changes may be made in form and detail without departing from the spirit and scope of the invention.

What is claimed is:

1. An asperity sensing head for use in detecting asperities on a surface of a disc while the disc is rotating, the asperity sensing head comprising:

a slider body having a first rail and an air bearing surface;

a first asperity sensor carried by the slider body in the first rail and adjacent to the air bearing surface; and a second asperity sensor carried by the slider body in the first rail and adjacent to the air bearing surface, wherein the first asperity sensor is separated from the second asperity sensor by a groove in the first rail.

2. The asperity sensing head of claim 1 and further including:

a second rail; and a third asperity sensor carried by the slider body in the second rail and adjacent to the air bearing surface; and a fourth asperity sensor carried by the slider body in the second rail and adjacent to the air bearing surface, wherein the third asperity sensor is separated from the fourth asperity sensor by a groove in the second rail.

3. The asperity sensing head of claim 1 wherein the first and second asperity sensors each comprise:

a flat asperity contacting portion having a surface length L adjacent the groove having a groove width W, a number N is indicative of contacts between the first asperity and the asperity sensors within a threshhold time period, the slider flying above the surface of the disc at a pitch angle $\theta_p$ relative to the surface of the disc as the disc is rotated, wherein the slider has a fly height $H_{FH}$ associated therewith, and wherein a height $H_A$ of the first asperity is determined based on the number N, the pitch angle $\theta_p$, the length L, the groove width W and the fly height $H_{FH}$ according to the relationship:

$$H_A = H_{FH} + N(L+W)\theta_p.$$

4. The asperity sensing head of claim 1 wherein the groove extends only partially across the first rail.

5. The asperity sensing head of claim 1 wherein the groove is configured to burnish the asperity.

6. The asperity sensing head of claim 1 wherein the groove is oriented relative to a longitudinal axis of the first rail to accomodate for a skew angle between the longitudinal axis of the first rail and a track on the disc.

7. The asperity sensing head of claim 1 and further comprising:

at least a third asperity sensor on the first rail separated from the second asperity sensor by a second groove in the first rail wherein the first and second grooves have different sizes.

8. The asperity sensing head of claim 1 wherein the slider comprises a center rail slider and wherein the first and second asperity sensors and the groove are on a center rail thereof.

9. The asperity sensing head of claim 1 wherein the first and second asperity sensors comprise PZT sensors.

10. The asperity sensing head of claim 1 wherein the asperity sensing head flies above the surface of the disc at a pitch angle relative to the surface of the disc such that a height of a first asperity on the surface of the disc is determined based on whether the first asperity contacts the air bearing surface proximate only the first asperity sensor or whether the first asperity contacts the air bearing surface proximate both the first and second asperity sensors.

11. An apparatus for detecting heights of asperities on a surface of a disc, the apparatus comprising:

a slider having a first rail forming a portion of an air bearing surface of the slider, the slider flying above the surface of the disc at a pitch angle $\theta_p$ relative to the surface of the disc as the disc is rotated;

a first plurality of asperity sensors carried by the slider in the first rail wherein each of the first plurality of asperity sensors has a length L and wherein each of the plurality of asperity sensors is separated from an adjacent one of the asperity sensors by a groove in the first rail wherein each groove has a groove width W; and asperity height estimating circuitry coupled to each of the first plurality of asperity sensors, the asperity height estimating circuitry detecting a number N of contacts between a first asperity and the asperity sensors within a threshhold time period and wherein the asperity height estimating circuitry estimates a height $H_A$ of the first asperity based on the number N, the pitch angle $\theta_p$, the length L and the groove width W.

12. The apparatus of claim 11 wherein the asperity height estimating circuitry is configured to estimate the height of the asperity based on a fly height of the slider above the surface of the disc.

13. The apparatus of claim 12, wherein the slider has a minimum fly height $H_{MFH}$ associated therewith, and wherein the asperity height estimating circuitry estimates the height $H_A$ of the first asperity based on the number N, the pitch angle $\theta_p$, the length L, the groove width W and the minimum fly height $H_{MFH}$ according to the relationship:

$$H_A = H_{MFH} + N(L+W)\theta_p.$$

14. The apparatus of claim 13 wherein L+W is between about 1 micron and about 1000 microns.

15. The apparatus of claim 14 wherein L+W is between about 10 microns and about 30 microns.

16. The apparatus of claim 15 wherein L+W is between about 20 microns and about 30 microns.

17. The apparatus of claim 11 wherein the slider has a second rail forming a portion of the air bearing surface of the slider, the apparatus further comprising:

a second plurality of asperity sensors carried by the slider in the second rail wherein each of the second plurality of asperity sensors is separated by a groove having a width W from the adjacent one of the second plurality of asperity sensors, and wherein the asperity height estimating circuitry is coupled to each of the second plurality of asperity sensors.

18. A method of determining a height of an asperity on a surface of a disc, the method comprising:

flying a slider above the surface of the disc at a pitch angle $\theta_p$ as the disc is rotated, wherein the slider has a first rail and a plurality of asperity sensors in the first rail adjacent to the air bearing surface of the slider and separeted by grooves, each groove having a width W;

detecting a number N of the plurality of asperity sensors which are contacted by the asperity; and determining a height $H_A$ of the asperity based on the number N.

19. The method of claim 18 wherein each of the plurality of asperity sensors has a length L and wherein determining the height $H_A$ of the asperity based on the number N further comprises:

determining the height $H_A$ of the asperity based on the number N, based on the pitch angle $\theta_p$, based on the groove width W and based on the length L.

20. The method of claim 19, wherein the slider has a minimum fly height $H_{MFH}$ associated therewith, and wherein determining the height $H_A$ of the asperity further comprises:

determining the height $H_A$ of the asperity based on the minimum fly height $H_{MFH}$.

21. The method of claim 20 wherein determining the height $H_A$ of the asperity comprises:
   determining the height of the asperity based upon the relationship $H_A = H_{MFH} + N(L+W)\theta_p$.

22. A method of mapping defects on a surface of a disc comprising:
   flying a slider above the surface of the disc at a single fly height above the disc such that the slider impacts asperities on the surface of the disc; and
   determining heights of asperities of different sizes based on the impact between the asperities and the slider at the single fly height.

23. The method of claim 22 wherein flying a slider comprises:
   flying the slider above the surface of the disc while rotating the disc at a single velocity.

24. The method of claim 22 wherein flying a slider comprises:
   flying the slider above the surface of the disc at a pitch angle $\theta_p$ as the disc is rotated, wherein the slider has a first rail and a plurality of asperity sensors in the first rail adjacent to the air bearing surface of the slider and sepereted by grooves, each groove having a width W; and
   wherein determining heights comprises:
   detecting a number N of the plurality of asperity sensors which are contacted by the asperity; and
   determining the height $H_A$ of the asperity based on the number N.

* * * * *